US008198208B2

(12) United States Patent
Gupta et al.

(10) Patent No.: US 8,198,208 B2
(45) Date of Patent: Jun. 12, 2012

(54) BROMINATION PROCESS

(75) Inventors: Rajender P. Gupta, Edmonton (CA); Zhenghe Xu, Edmonton (CA); Ian Clark, Camrose (CA); Hongqun Yang, Edmonton (CA)

(73) Assignee: EPCOR Power Generation Services, Inc., Edmonton, AB (CA)

( * ) Notice: Subject to any disclaimer, the term of this patent is extended or adjusted under 35 U.S.C. 154(b) by 450 days.

(21) Appl. No.: 12/569,598

(22) Filed: Sep. 29, 2009

(65) Prior Publication Data

US 2010/0126345 A1 May 27, 2010

Related U.S. Application Data

(60) Provisional application No. 61/102,499, filed on Oct. 3, 2008.

(30) Foreign Application Priority Data

Mar. 13, 2009 (CA) .................................... 2658469

(51) Int. Cl.
*B01J 20/00* (2006.01)
(52) U.S. Cl. .......................................... 502/400; 95/134
(58) Field of Classification Search .................. 95/134; 502/400
See application file for complete search history.

(56) References Cited

U.S. PATENT DOCUMENTS

| 6,878,385 B2 * | 4/2005 | Jensen et al. .................. 424/443 |
| 2004/0086439 A1 * | 5/2004 | Vosteen et al. ................. 423/210 |
| 2007/0179056 A1 * | 8/2007 | Baek et al. ..................... 502/400 |
| 2008/0121142 A1 * | 5/2008 | Comrie et al. ................. 106/707 |
| 2010/0031818 A1 * | 2/2010 | Higgins et al. .................... 95/58 |

FOREIGN PATENT DOCUMENTS

| CA | 2036746 A1 | 2/1992 |
| CA | 1300347 | 5/1992 |
| CA | 2150529 A1 | 12/1995 |
| CA | 2179000 A1 | 12/1996 |
| CA | 2261037 A1 | 1/1998 |
| CA | 2330583 A1 | 11/1999 |
| CA | 2291304 A1 | 6/2000 |
| CA | 2400898 A1 | 8/2001 |
| CA | 2456272 A1 | 2/2002 |
| CA | 2381610 A1 | 10/2002 |
| CA | 2441961 A1 | 10/2002 |
| CA | 2418578 A1 | 8/2003 |
| CA | 2522258 A1 | 11/2003 |
| CA | 2435474 A1 | 1/2004 |
| CA | 2506770 A1 | 5/2004 |
| CA | 2512520 A1 | 7/2004 |
| CA | 2523132 A1 | 11/2004 |
| CA | 2487843 A1 | 5/2005 |
| CA | 2490671 A1 | 6/2005 |
| CA | 2557159 A1 | 10/2005 |
| CA | 2557218 A1 | 10/2005 |
| CA | 2509029 A1 | 12/2005 |
| CA | 2576210 A1 | 3/2006 |

(Continued)

*Primary Examiner* — Robert J Hill, Jr.
*Assistant Examiner* — Christopher P Jones
(74) *Attorney, Agent, or Firm* — Polster, Lieder, Woodruff & Lucchesi, L.C.

(57) ABSTRACT

A bromination process includes contacting fly ash with liquid bromine to increase the mercury adsorbing ability of the fly ash. The resultant brominated fly ash can be used to adsorb mercury in a high temperature combustion gas.

20 Claims, 13 Drawing Sheets

FOREIGN PATENT DOCUMENTS

| | | | |
|---|---|---|---|
| CA | 2577970 | A1 | 3/2006 |
| CA | 2584327 | A1 | 4/2006 |
| CA | 2522427 | A1 | 5/2006 |
| CA | 2587200 | A1 | 8/2006 |
| CA | 2599420 | A1 | 8/2006 |
| CA | 2600041 | A1 | 9/2006 |
| CA | 2600044 | A1 | 9/2006 |
| CA | 2600485 | A1 | 9/2006 |
| CA | 2600876 | A1 | 9/2006 |
| CA | 2601239 | A1 | 9/2006 |
| CA | 2621635 | A1 | 3/2007 |
| CA | 2568292 | A1 | 5/2007 |
| CA | 2628198 | A1 | 5/2007 |
| CA | 2569760 | A1 | 6/2007 |
| CA | 2557695 | A1 | 7/2007 |
| CA | 2600786 | A1 | 3/2008 |
| CA | 2602326 | A1 | 3/2008 |
| CA | 2611817 | A1 | 5/2008 |
| CA | 2619194 | A1 | 8/2008 |
| WO | 2004108254 | A1 | 12/2004 |
| WO | 2006075999 | A2 | 7/2006 |
| WO | 2007064500 | A1 | 6/2007 |
| WO | 2007073495 | A2 | 6/2007 |
| WO | 2007112248 | A2 | 10/2007 |
| WO | 2007140073 | A2 | 12/2007 |
| WO | 2007149837 | A3 | 12/2007 |
| WO | 2007149867 | A1 | 12/2007 |
| WO | 2008064360 | A2 | 5/2008 |
| WO | 2008073889 | A2 | 6/2008 |
| WO | 2008100243 | A1 | 8/2008 |

* cited by examiner

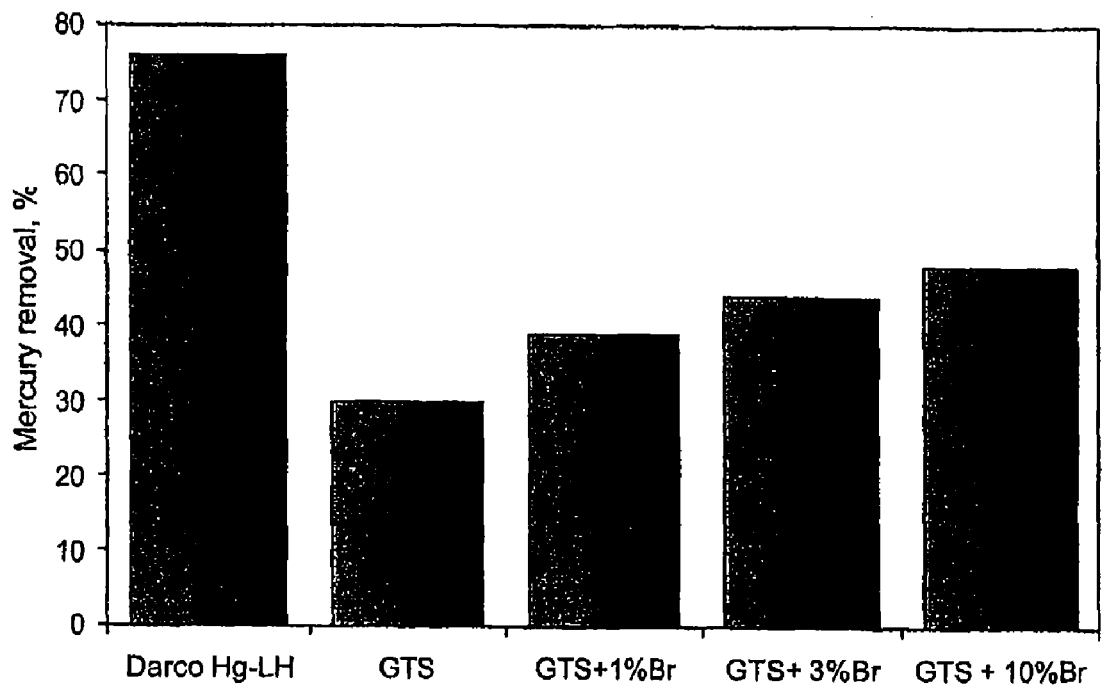
Figure 1. Phase I test summary
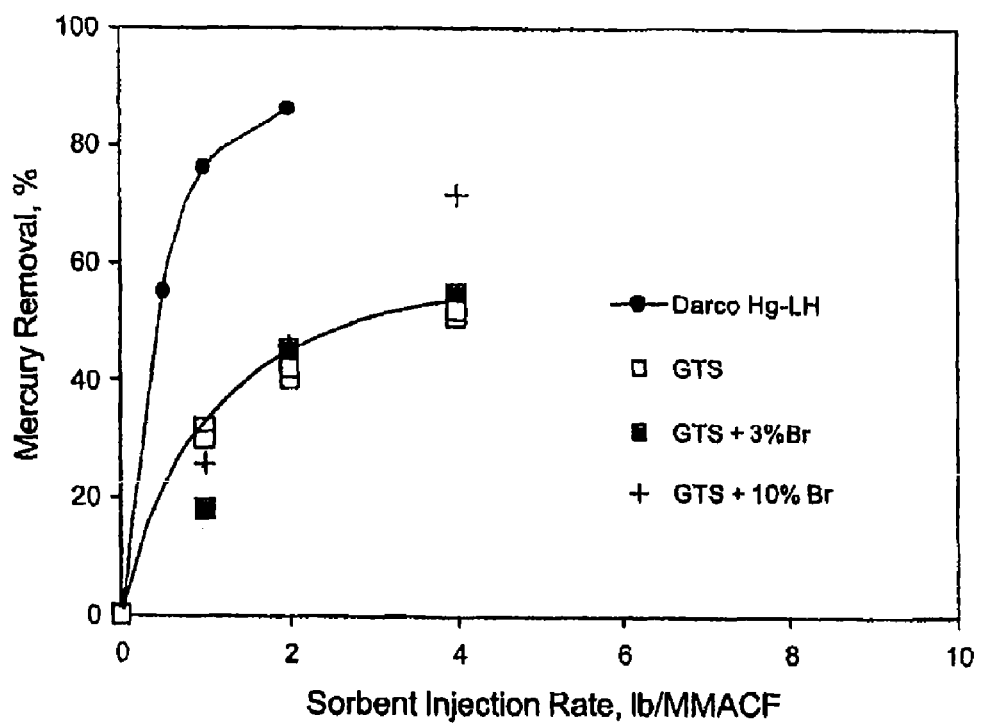
Figure 2. Results of Phase II testing

| Sample Name: | SOP Name: | Measured: | |
|---|---|---|---|
| William A. | Coal Ash | Monday, Feb. 25, 2008 1:45:49 PM | |
| Sample Source & Type: | Measured by: | Analyzed: | |
| Factory | mastersizer | Monday, Feb. 25, 2008 1:45:50 PM | |
| | Result Source: | | |
| | Measurement | | |
| Particle Name: | Accessory Name: | Analysis Model: | Sensitivity: |
| Coal Ash | Hydro 2000SM (A) | General purpose | Enhanced |
| Particle RI: | Absorption: | Size Range: | Obscuration: |
| 1,500 | 0 | 0.020 to 2000.000 um | 16.27% |
| Dispersant Name: | Dispersant RI: | Weighted Residual: | Result Emulation: |
| Water | 1.330 | 0.936% | Off |
| Concentration: | Span: | Uniformity: | Result units: |
| 0.0220 % vol | 2.887 | 0.893 | Volume |
| Specific Surface Area: | Surface Weighted Mean D[3,2]: | Vol. Weighted Mean D[4,3]: | |
| 0.578 m²/g | 10.384 um | 23.846 um | |

D(0.1):4.329 um    d(0.5): 17.009 um    d(0.9): 53.438 um

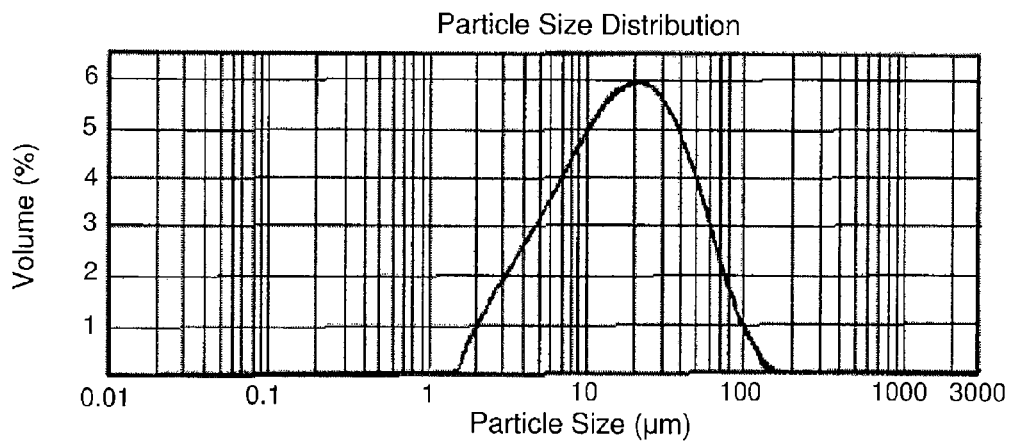

Fig. 3

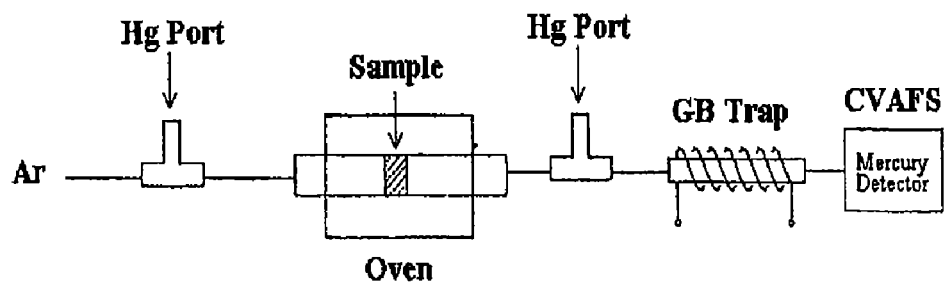
Figure 4. Experimental set up for mercury capture tests
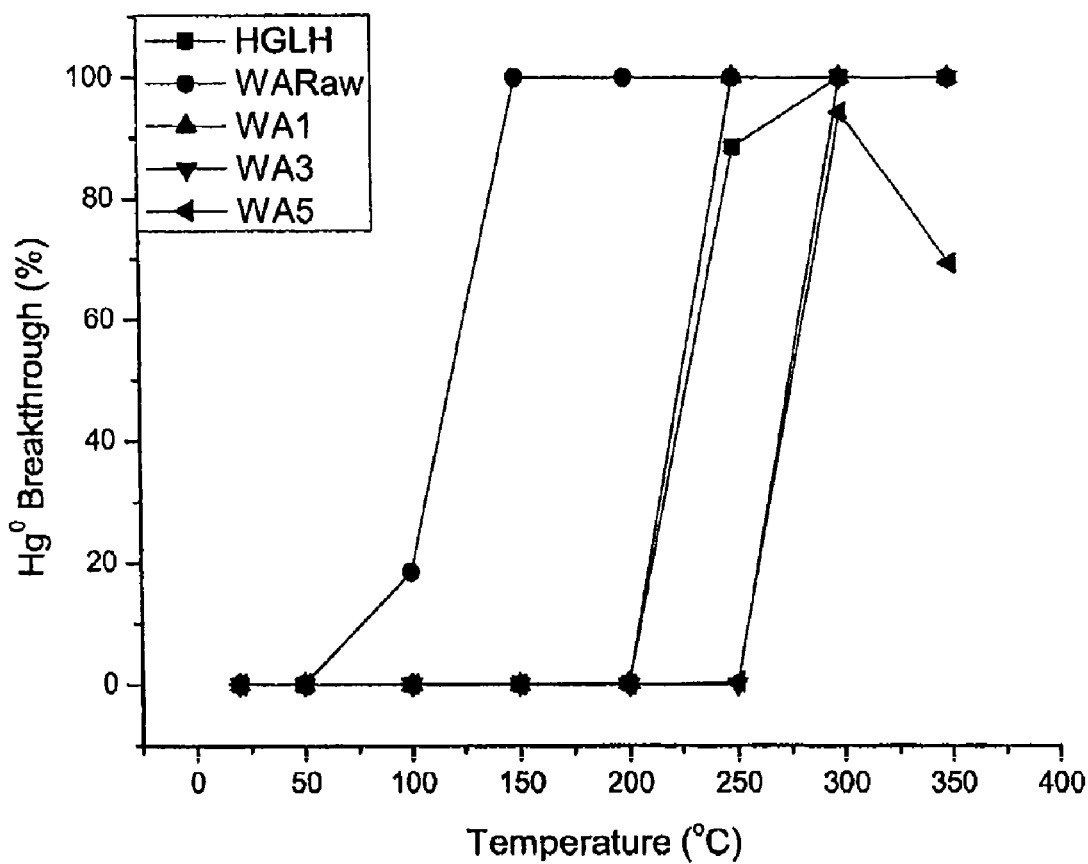
Figure 5. Mercury breakthrough of HGLH, WARaw, WA1, WA3, WA5.

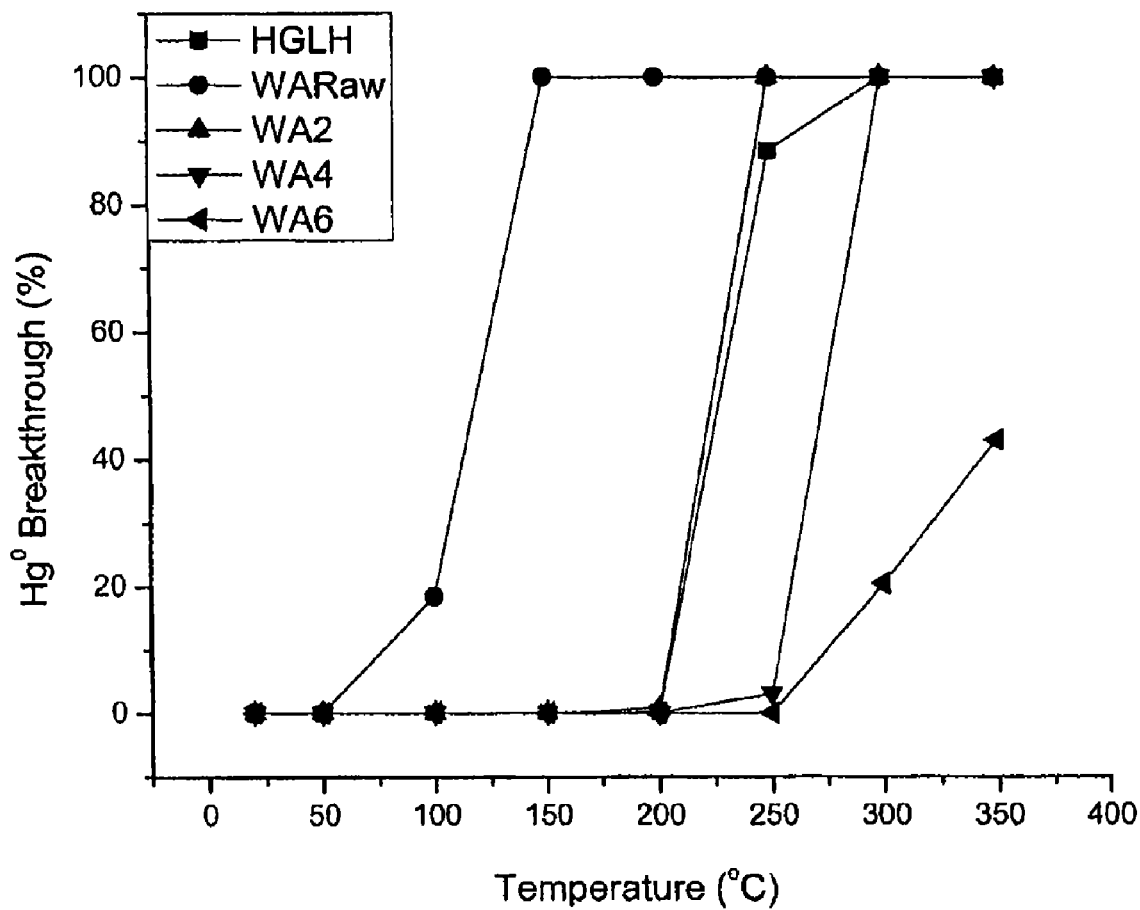
Figure 6. Mercury breakthrough of HGLH, WARaw, WA2, WA4, WA6.

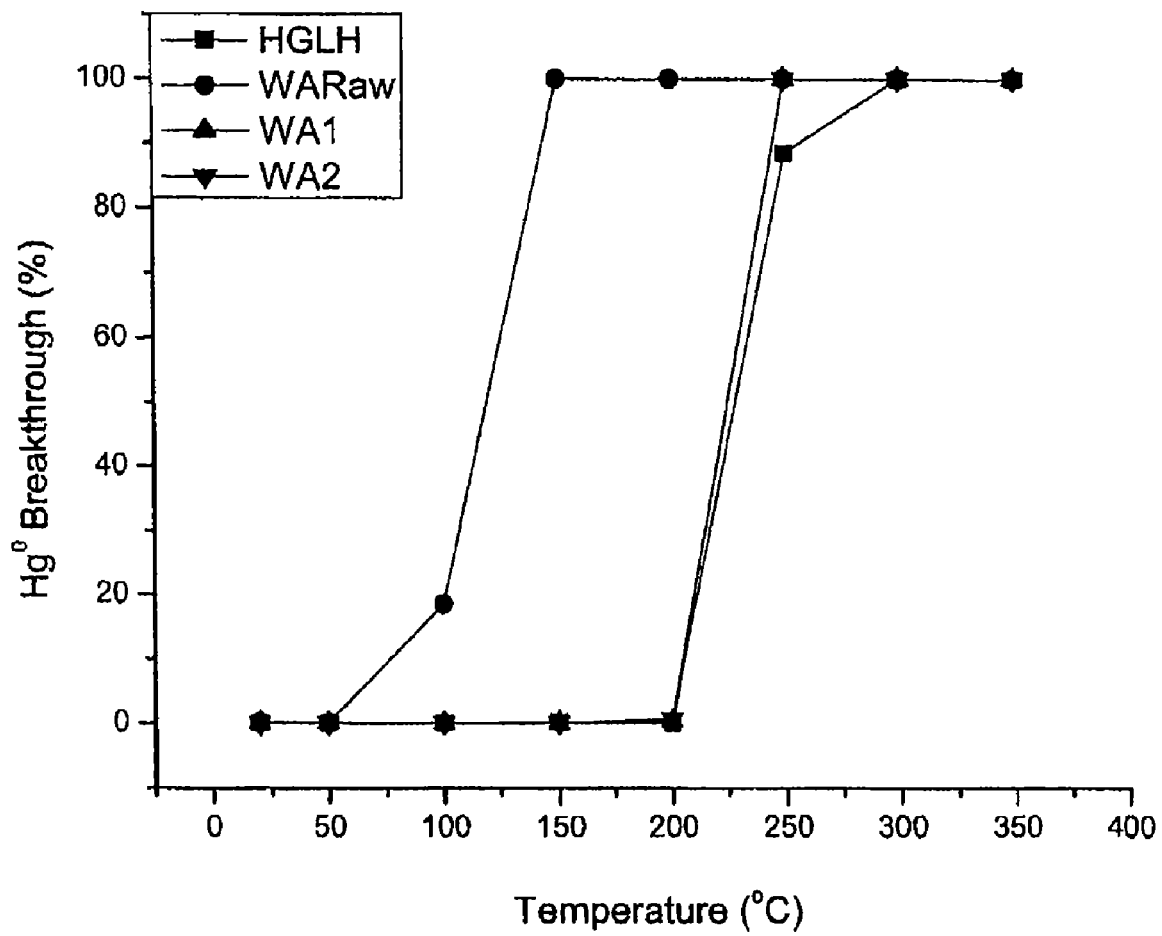
Figure 7. Mercury breakthrough of HGLH, WARaw, WA1, WA2.

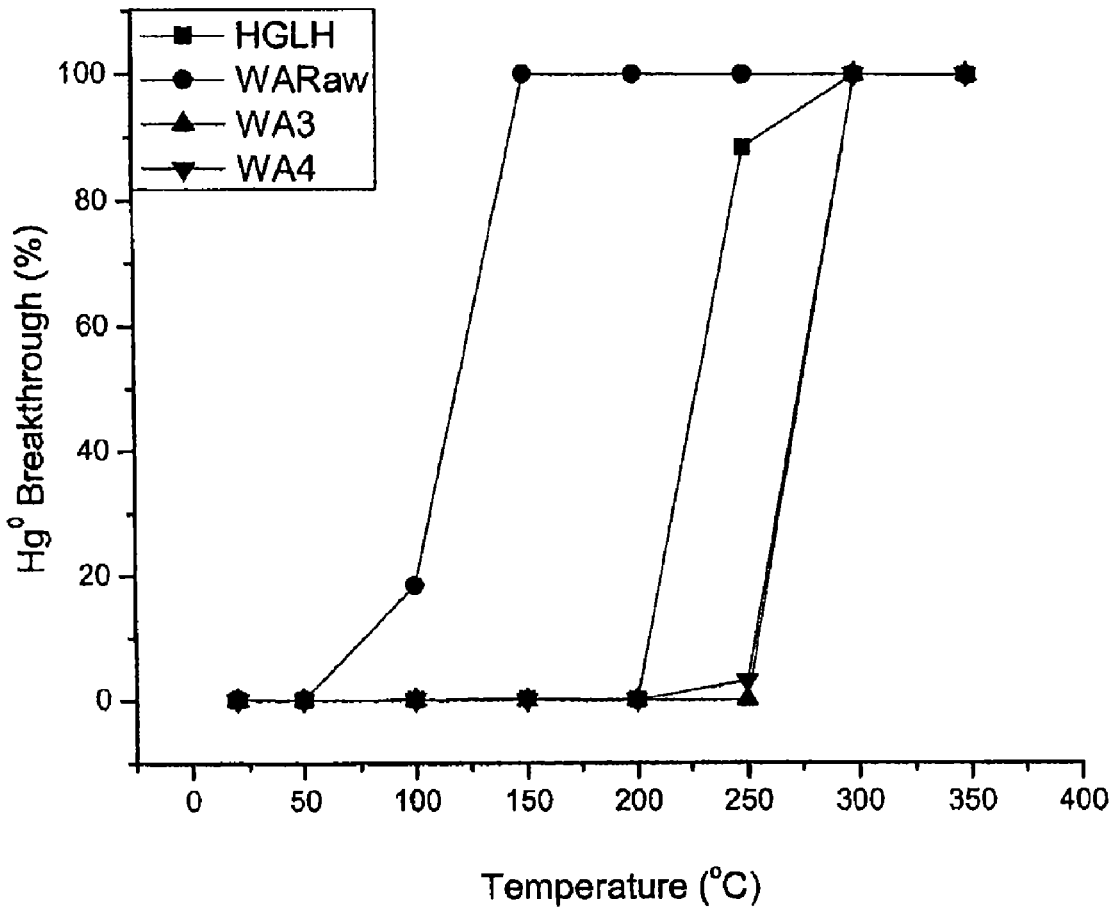
Figure 8. Mercury breakthrough of HGLH, WARaw, WA3, WA4.

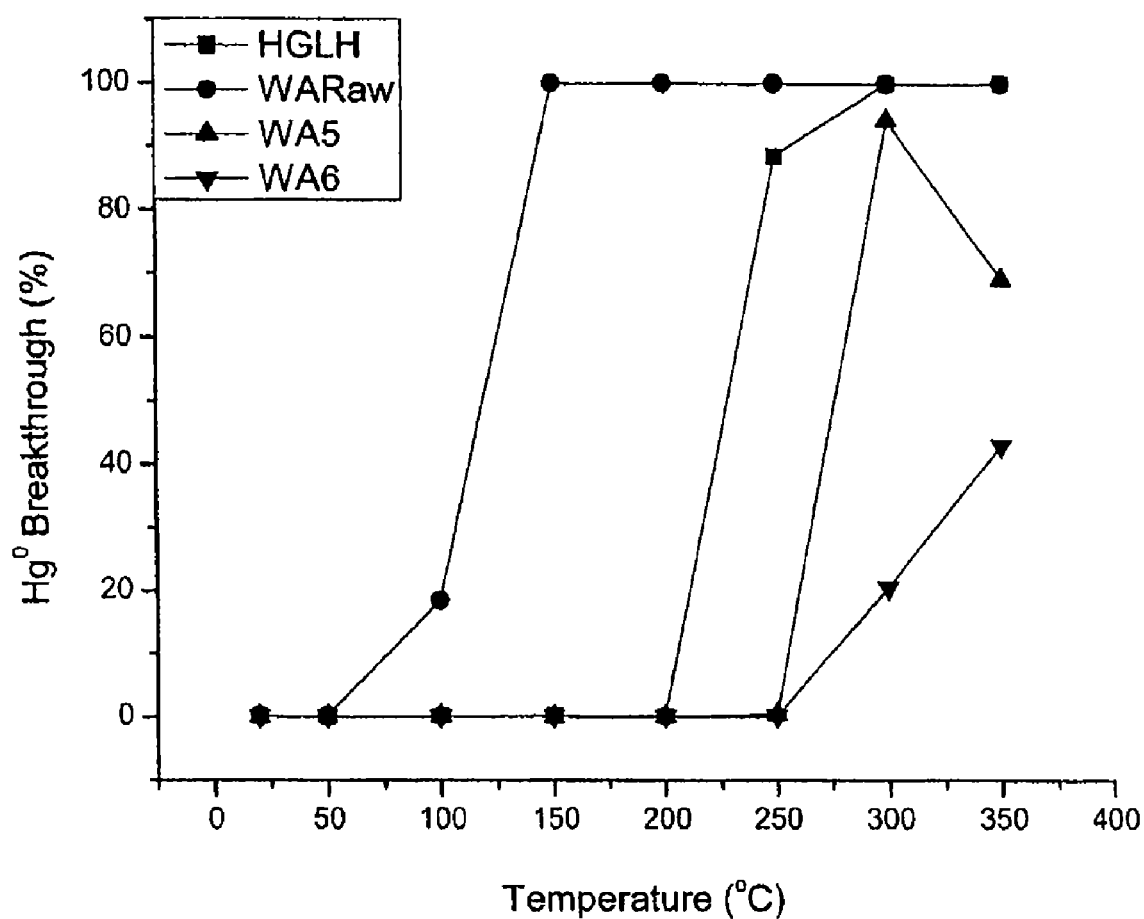
Figure 9. Mercury breakthrough of HGLH, WARaw, WA5, WA6.

| Inj. Conc. | SDA Outlet Injection | | | | | |
|---|---|---|---|---|---|---|
| Lb/Mmacf | Hg-LH | ADA PPP | GTS | GTS-B | CTI Inlet | CTI Outlet |
| 0 | 72 | 64 | 73 | 70 | | |
| 0.25 | 82 | 74 | | | | |
| 0.5 | 86.1 | 81 | | | 87.7 | 85.4 |
| 0.75 | 87.5 | 86.1 | 80 | | | |
| 1 | 88.7 | 90.8 | | 87 | | |

Both Brominated and non-Brominated GTS Sorbents Injected at the SDA Outlet

BROMINATION PROCESS

CROSS REFERENCE TO RELATED APPLICATIONS

This application claims the benefit of priority of U.S. Provisional Patent Application No. 61/102,499 filed Oct. 3, 2008 and Canadian Patent Application No. 2,658,469, filed Mar. 13, 2009, which are incorporated herein by reference in their entirety.

FIELD OF THE INVENTION

The present invention relates generally to the removal of mercury from exhaust streams, such as combustion gas streams from coal-fired power plants. More particularly, the present invention relates to sorbents used to accomplish the same.

BACKGROUND OF THE INVENTION

Electricity produced via coal combustion results in the emission of gaseous and particulate mercury, a substance that is know to bio-accumulate and cause adverse reactions when consumed. It is very difficult to capture and remove the mercury contained in the flue gas due to the high flue gas velocities, and the low concentrations of mercury contained in the flue gas, as well as the high gas temperatures, the presence of many other complicating compounds in the flue gas, and the fact that multiple mercury species have to be sequestered.

Each of these gas or liquid streams has different characteristics that make some mercury removal methods effective and appropriate, but others, ineffective and inappropriate. Consequently, over the years, a multitude of approaches have had to be developed for effectively removing mercury species from various streams. These overall approaches include, among others: liquid scrubbing technologies, homogenous gas-phase technologies, metal amalgamation techniques, and processes utilizing various sorbent materials in different application schemes, with adsorbents optionally impregnated with various reaction aids.

In the past, activated carbons have demonstrated utility for sequestering mercury vapors in some applications. When combined with halogen compounds, especially iodine, the mercury sequestration performance of activated carbons can be improved.

U.S. Pat. No. 6,953,494 (Nelson) describes a method for removing mercury from a combustion gas in an exhaust gas system. The method has the steps of: providing a mercury sorbent, injecting the mercury sorbent into a stream of the mercury-containing combustion gas for a sufficient time to allow at least an effective amount of the mercury and in the combustion gas to adsorb onto the mercury sorbent, and collecting and removing the mercury sorbent from the combustion gas stream. The mercury sorbent is prepared by treating a carbonaceous substrate with an effective amount of a bromine-containing gas, especially one containing elemental bromine or hydrogen bromide, for a time sufficient to increase the ability of the carbonaceous substrate to adsorb mercury and mercury-containing compounds. The carbonaceous substrate is preferably acticated carbon. A critical element in the process is that a bromine-containing gas is used to treat the carbonaceous substrate.

U.S. Pat. No. 6,027,551 (Hwang et al.) describes a process where mercury emission from a flue gas such as that generated by a coal fired power plant is controlled by injecting into the flue gas unburned carbon purified from ash such as fly ash or wood ash. The unburned carbon adsorbs the mercury and is later removed from the flue gas by a particle separator. The unburned carbon collected from ash is significantly lower in cost compared to activated carbon conventionally used in such a process. The unburned carbon is concentrated in the sorbent by one or more separation processes used to remove non-carbon particles from the fly ash. These processes include gravity separation, electrostatic separation, froth flotation, magnetic separation and size classification. Mercury adsorption is further increased by oxidation of the carbon surface.

SUMMARY OF THE INVENTION

It is an object of the present invention to obviate or mitigate at least one disadvantage of previous processes or products.

In a first aspect, the present invention provides a bromination process comprising contacting a fly ash substrate with liquid bromine for a sufficient time to increase the mercury adsorbing ability of the fly ash substrate to provide a brominated mercury sorbent capable of adsorbing mercury in a combustion gas.

In a second aspect, the present invention provides a mercury sorbent prepared according to the first aspect.

In a third aspect, the present invention provides a use of the mercury sorbent of the second aspect for adsorbing mercury in a combustion gas.

In a fourth aspect, the present invention provides a use of liquid bromine for brominating fly ash for providing a mercury sorbent capable of adsorbing mercury in a combustion gas.

In a fifth aspect, the present invention provides a method for removing mercury from a mercury-containing combustion gas in an exhaust gas system, comprising the steps of: providing a mercury sorbent that has been prepared by treating fly ash with an effective amount of liquid bromine for a sufficient time to increase the ability of the fly ash to adsorb mercury; injecting the mercury sorbent into a stream of the mercury-containing combustion gas for a sufficient time to allow at least a portion of the mercury in the combustion gas to adsorb onto the mercury sorbent; and collecting and removing the mercury sorbent from the combustion gas stream.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1 is a graph showing the degree of mercury removal for five different sorbents of Example 1;

FIG. 2 is another graph showing the degree of mercury removal as a function of sorbent injection rate of Example 1;

FIG. 3 is a graph showing the particle size distribution of the ash of Example 2;

FIG. 4 is a diagram showing the experimental setup for mercury capture tests of Example 3;

FIGS. 5 to 9 are graphs showing mercury breakthrough as a function of temperature of Example 3;

DETAILED DESCRIPTION

Figure 10:
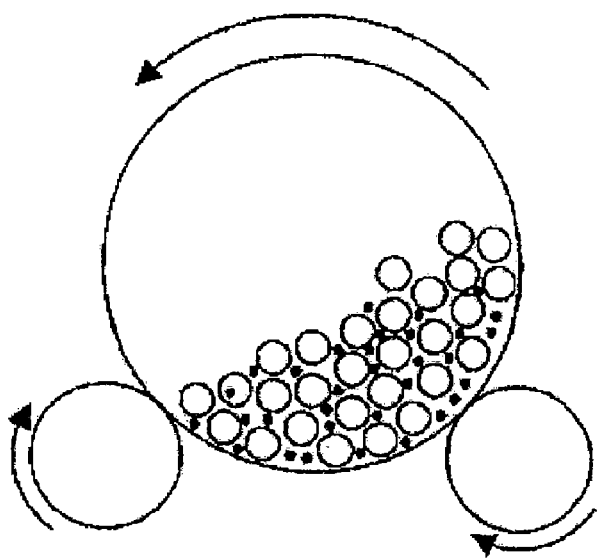
FIG. 10 is a schematic of a chemical-mechanical bromination process of Example 4.
Figure 11:
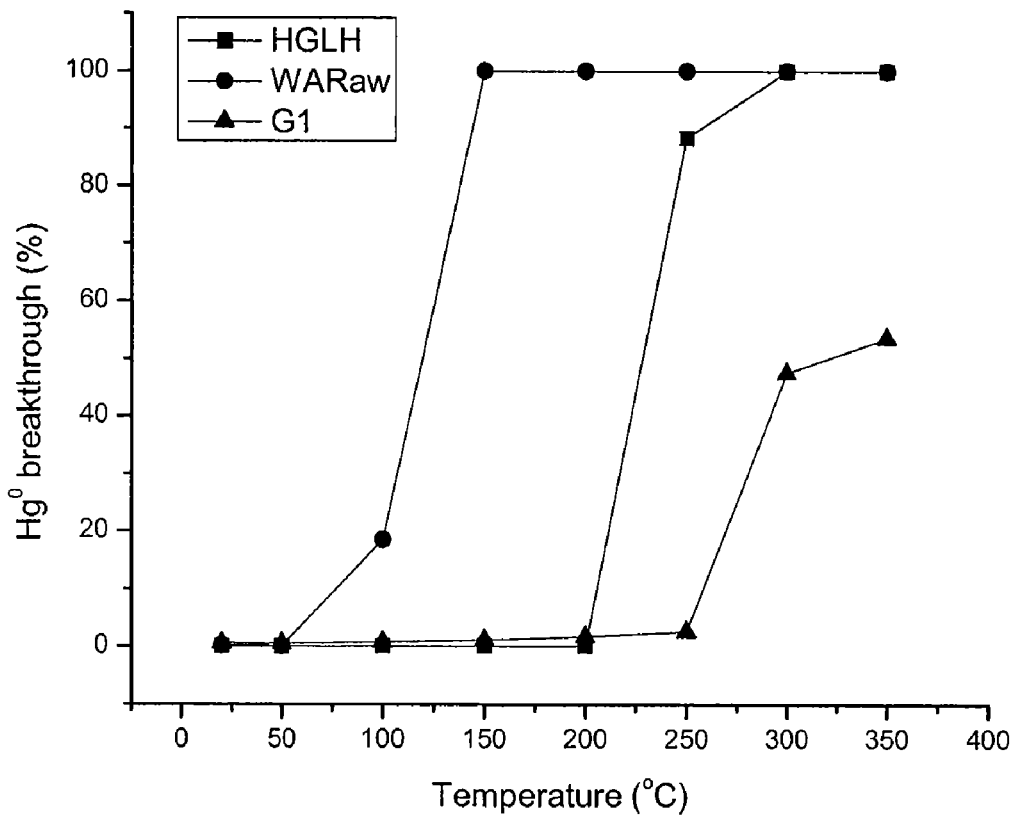
FIGS. 11 to 13 are graphs showing mercury breakthrough as a function of temperature of Example 4.
Figure 12:
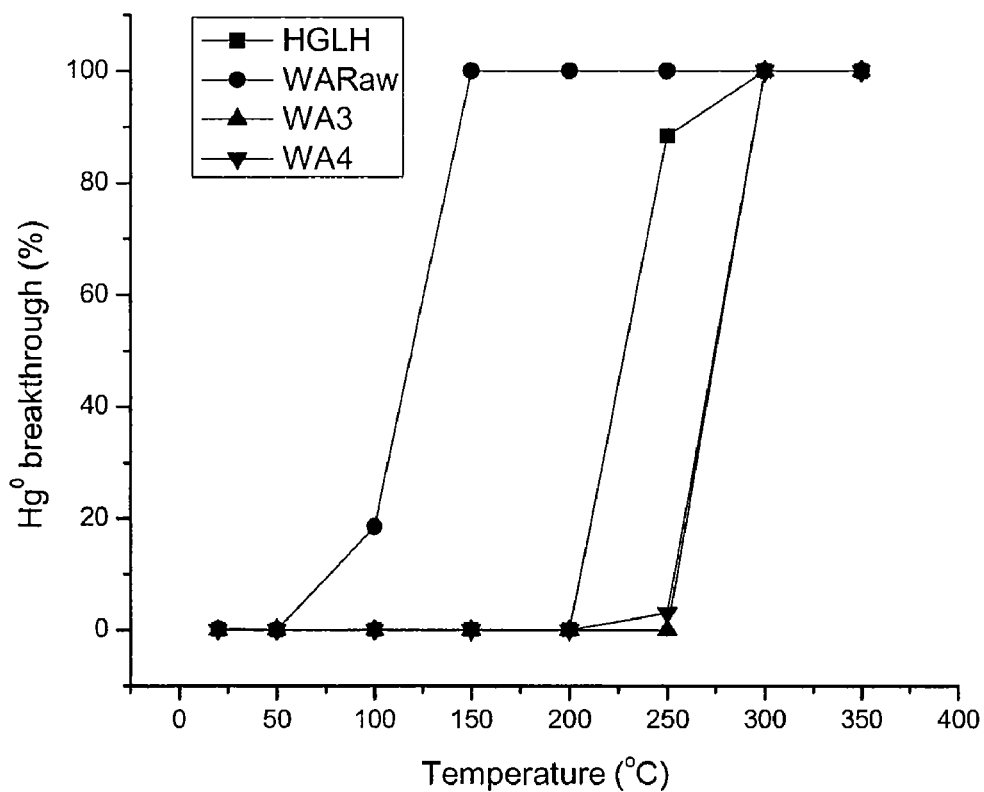
Figure 13:
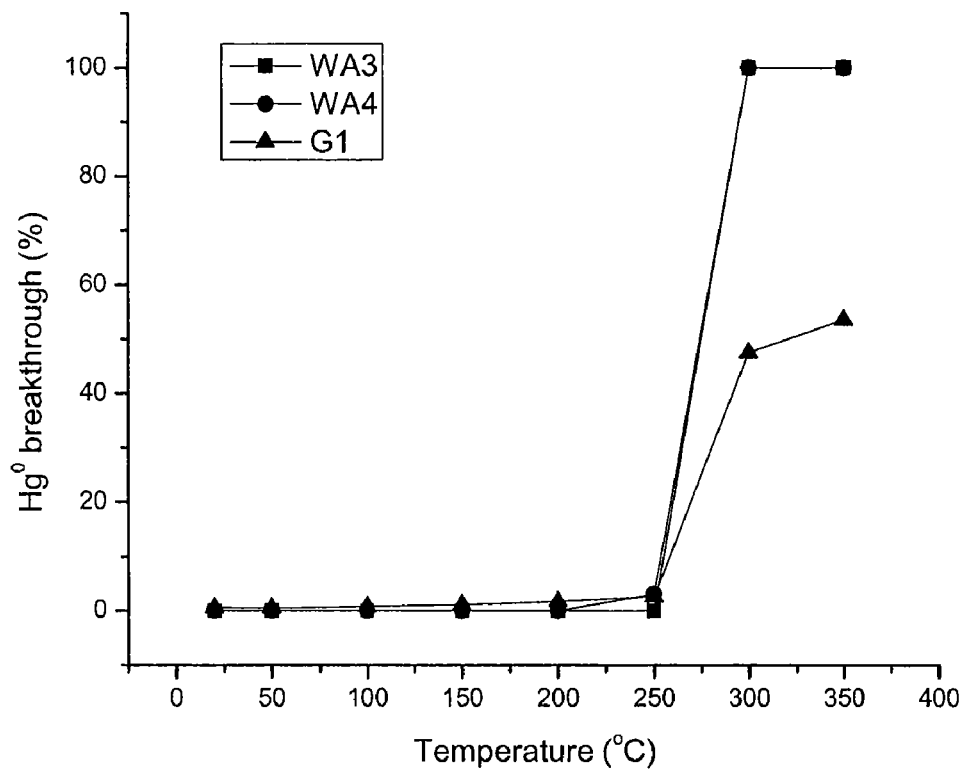
Figure 14:
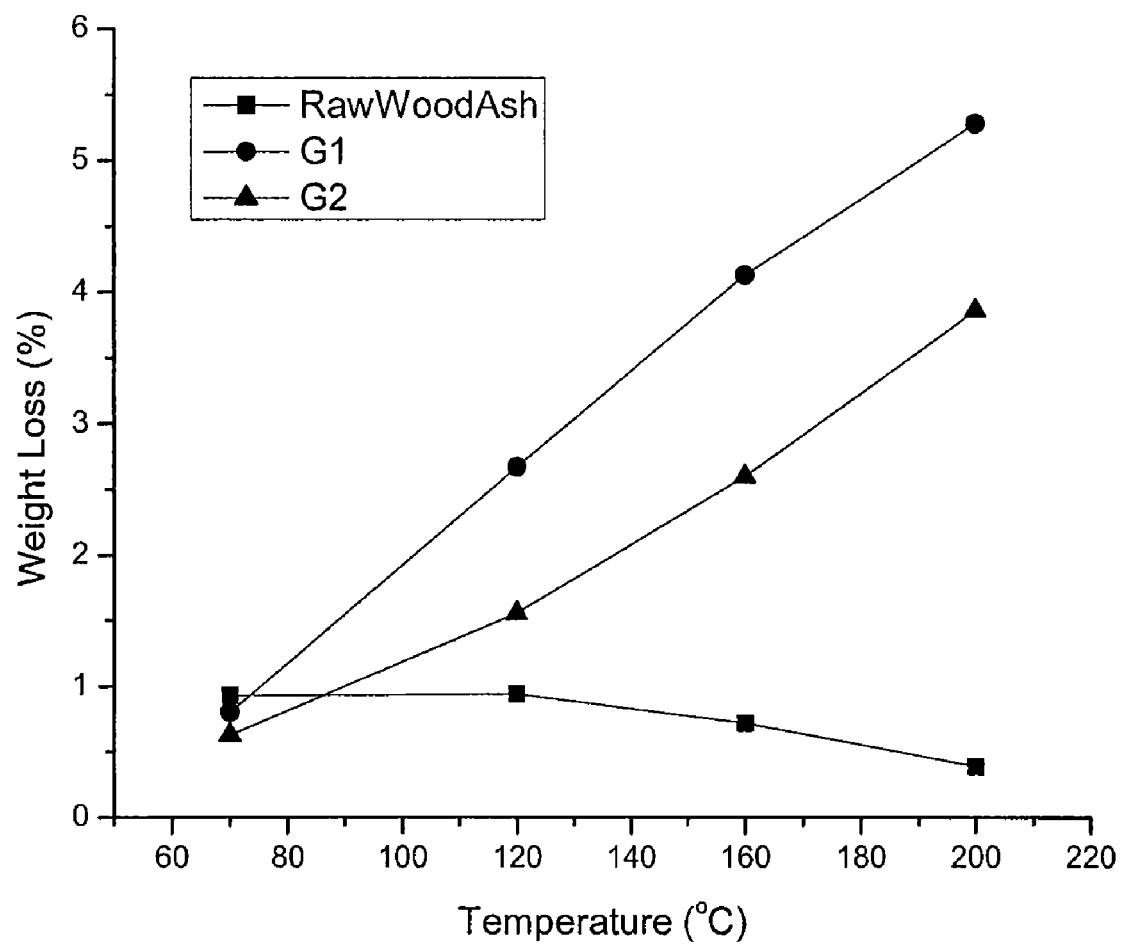
FIG. 14 is a graph showing weight loss as a function of temperature of Example 4.
Figures 15, 16:
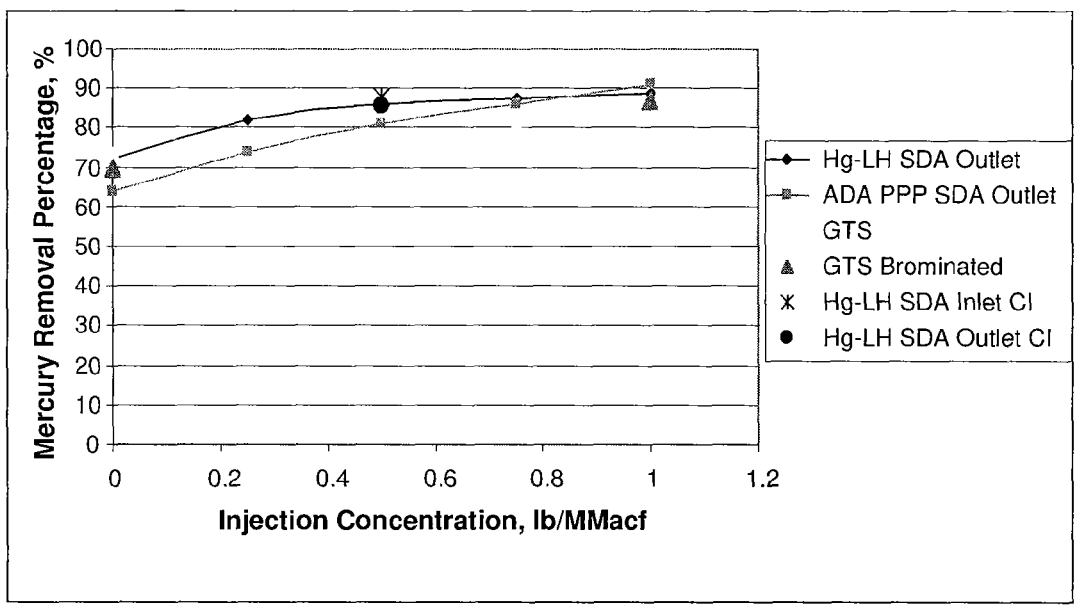
FIGS. 15 to 18 are tables and graphs showing the results of Example 5.
Figure 17:
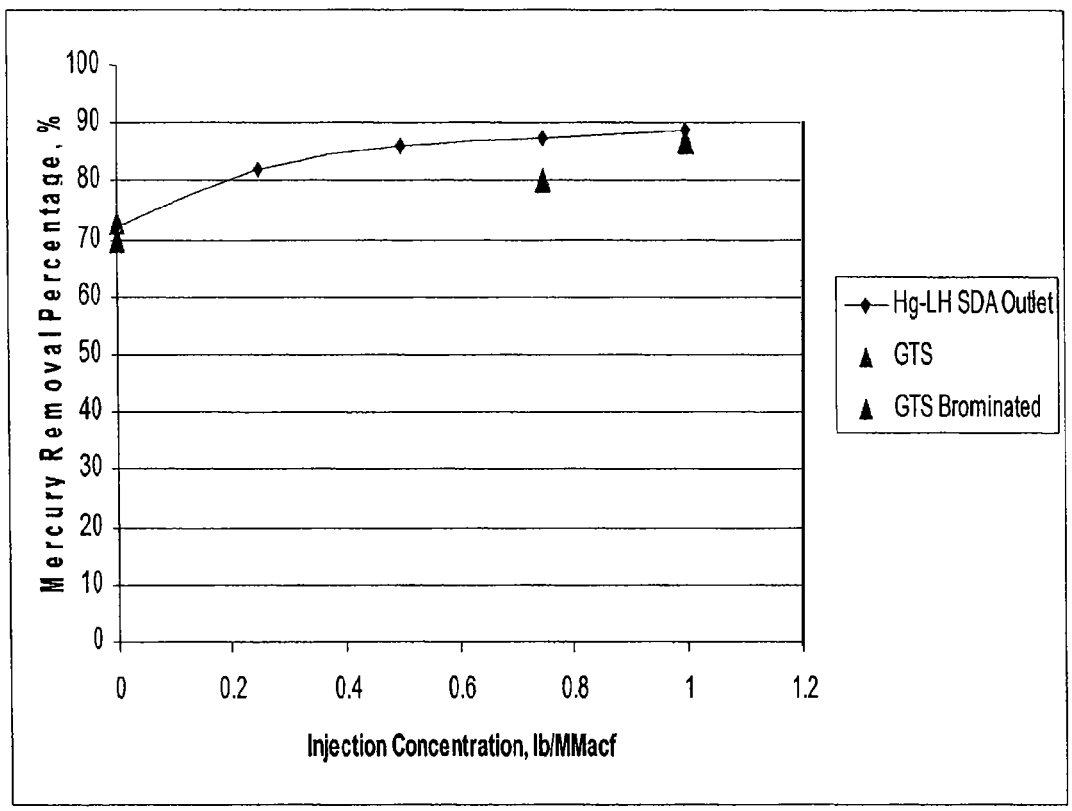
Figure 18:
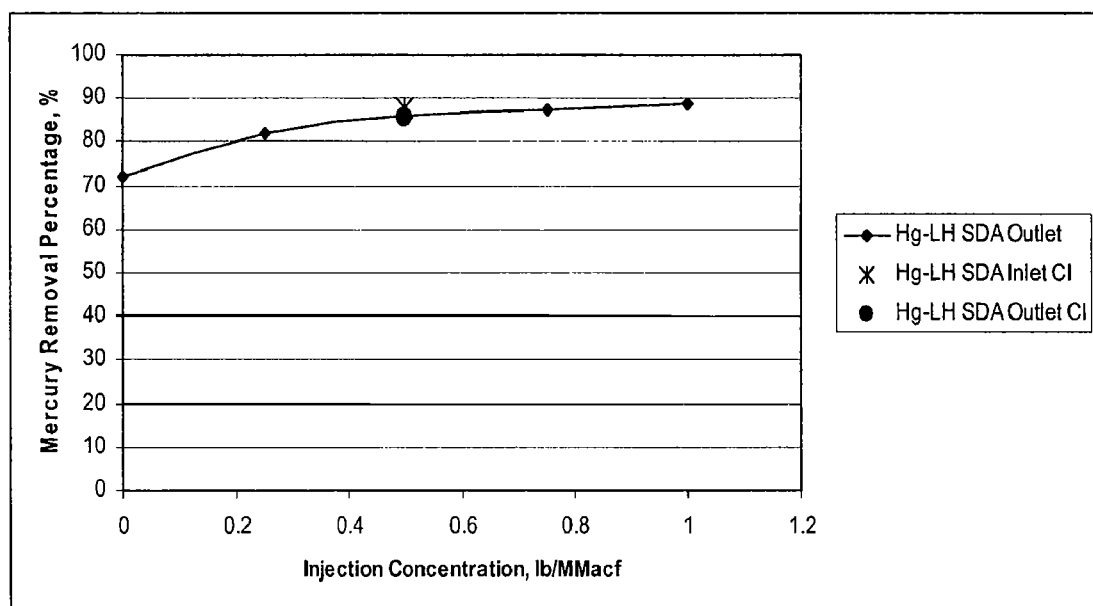

Generally, the present invention provides a bromination process includes contacting fly ash with liquid bromine to increase the mercury adsorbing ability of the fly ash. The resultant brominated fly ash can be used to adsorb mercury in a high temperature combustion gas.

The expression "fly ash" will be used herein to include, in addition to fly ash, unburned carbons in the form of wood ash, and other charred carbanaceous material. Fly ash as used herein excludes activated carbon. Usually, fly ash is a combustion by-product. Unburned carbons, including those in or from fly ash, wood ash, and other charred carbonaceous materials, are different from activated carbons because no activation process has been involved. Fly ash also includes ash from the burning of biomass.

As used herein, a "sorbent" refers to a substance having a capacity to adsorb, absorb, and/or otherwise entrap a desired material, such as an air toxic.

Limitations of the known processes include the limited supply of a substrate material, the contamination of fly ash with carbon, and the release of excess bromine through the stack. The current invention looks to provide a cost-effective method of removing mercury from flue gas.

In one embodiment of the instant invention, there is provided a process comprising the following steps:

1. Obtain fly ash.
2. Ensure material is dry, for instance having a moisture content of 0 to 5%. Depending on the moisture content, optionally dessicate the material at a low temperature to prevent the release of mercury found in the raw material. In one embodiment, this low temperature is below 100° C., or below 90° C. or about 50° C., or 30° C. to 70° C., or 40° C. to 60° C. It has been found that above 100° C. mercury is emitted, which is not desired. Fly ash has been defined above. In one embodiment, the fly ash has a high carbon content, for instance, 50 to 70% carbon (by contrast, coal ash may have a carbon content of 0.3 to 0.8%).
3. Chemo-mechanical bromination process
    (a) Combine glass or another non-ferrous metal including lead, tantalum, Hastelloy B, Hastelloy C or Monel, or a glass lined steel or ceramic material (excluding carbon and graphite), beads and liquid bromine (in one embodiment, the liquid bromine has a purity greater than 99.9%) in a glass container (or a container made from glass lined steel, tempered glass, porcelain, fused silica chemical stoneware or acid brick) with a glass to bromine volumetric ratio of about 35, or 30 to 40, or 25 to 45, or 20 to 50, or another ratio.
    (b) Incorporate raw material in ratio corresponding to the desired bromination level.
    (i) For example, for 10% bromination, 500 grams of raw material to be combined with 50 grams of liquid bromine.
    (c) Seal glass bottle and position on rollers. In another embodiment, this step is achieved using conventional bromination, such as that described in U.S. Pat. No. 6,953,494, the contents of which are incorporated herein by reference.
    (d) Rotate for at least 30 minutes or at least 20 minutes, or at least 10 minutes, or another time to combine the bromine and the fly ash (chemical portion of the process) and to reduce the fly ash average particle diameter (mechanical portion of the process).
    (e) Separate raw material from the glass beads using a sieve, for instance a 3.5 mm sieve.
    (f) Heat now brominated raw material to about 200° C. This will release the improperly bound bromine which will reduce the risk of partially bound bromine being released up the stack when the sorbent is introduced in the flue gas process. Due to the presence of native mercury in the fly ash, the maximum temperature the brominated raw material can be heated to is about 240° C. as the mercury breakthrough occurs at 250° C.
    (g) Once the sorbent is heated, it can be injected in the combustion gases of a coal-fired power plant.

Various modifications of this process may be made, including, but not limited to:
1. modifying the ratio of bromine to glass beads;
2. increasing or decreasing the length of the heating phase;
3. modifying the rolling speed to optimize size modification and bromine adsorption; and
4. sieving material prior to bromination to ensure only optimal particle size is brominated and that minimal amount of bromine is used—reducing the possibility of bromine emissions.

Advantages of the current process include the absence of gaseous bromine/bromide in the process; the low processing temperature (for instance about 200° C.); the low cost of the raw material; the absence of an activation process (since the raw material is a by-product of a high temperature combustion, it already has gone through a process similar to activation).

The manufacturing process is not limited by the type of process equipment used. Any equipment or method that quickly and evenly distributes the liquid bromine to intimately contact the fly ash will function. For instance, a rotating drum or ball mill can be used as the rotation of the beads also serves as a grinding mechanism.

EXAMPLES

In Examples 1 to 5 below, wood ash was used. Tables 1 and 2, below, show the amounts of metals and other substances in the wood ash that are to be reported to the NPRI, although these samples were not necessarily from the same batch as used in the examples below. The fly ash is further defined as follows in terms of the fuel, boiler, and emissions involved in its production.

Fuel

The plant burns more than 550,000 green t/yr of wood waste from sawmills. The fuel mix is approximately 40%-50% bark; the rest is an assortment of sawdust, chips, and slabs. Fuel specifications include moisture content of 35%-55%.

Boiler

The boiler is a two-drum, top-hung watertube design delivering 561,750 lb/h of 1575 psig, 950° F. steam when burning design fuel with 33% excess air. Steam temperature is controlled by interstage superheater attemperation. Combustion takes place on and over three vibrating water-cooled grates inclined about 6% from horizontal. With each grate vibrated intermittently, burning fuel and ash slide during operation from the rear of the furnace to the front, where ash falls into a water-filled ash hopper. Intermittent vibration also prevents ash deposits from forming and helps maintain free fuel flow.

Incoming fuel is evenly spread over the upper portion of each grate by airswept distributor spouts located on the front furnace wall. Small particles entering the furnace are burned in suspension; larger pieces burn on the grate. About 75%-80% of the fuel particles are smaller than ¼ in. The boiler furnace provides residence time longer than 3 s at guaranteed conditions to achieve sufficient carbon burnup without reinjecting char. Balanced draft is employed with a single FD (force draft) fan supplying inlet air to the furnace, an ID (induced draft) fan discharging flue gas, and a fuel distribution air fan supplying motive air to the fuel distributor spouts. A tubular air heater heats combustion air from the FD fan before it enters the furnace.

Emissions

Flue gas passes to the stack through a mechanical dust collector, the ID fan, and an ESP. Fly ash is removed at three locations: the convection and air heater sections of the boiler, the mechanical dust collector, and the ESP. The dust collector consists of a multiple cyclone-type separator with 70% minimum removal efficiency. The ESP has five fields, and is sized to meet the particulate emissions limit of 0.02 gr/dscf with one field out of service. Fly ash rich in carbon collected by the ESP hoppers is used as a raw material to produce the sorbent using the chemical mechanical bromination method.

TABLE 1

| Element | FLY ash-25% g/tonne |
|---|---|
| Silver | 0.25 |
| Arsenic | 0.5 |
| Gold | 0.5 |
| Barium | 1170 |
| Bismuth | 0.5 |
| Cadmium | 0.5 |
| Cobalt | 85 |
| Chromium | 89 |
| Copper | 260 |
| Lanthanum | 68 |
| Molybdenum | 0.5 |
| Nickel | 292 |
| Lead | 75 |
| Antimony | 0.5 |
| Strontium | 718 |
| Thorium | 0.5 |
| Uranium | 102 |
| Vanadium | 72 |
| Tungsten | 0.5 |
| Zinc | 1590 |

TABLE 2

| Element | mg/dry/kg |
|---|---|
| Aluminum | 14900 |
| Antimony | 20 |
| Arsenic | 100 |
| Barium | 485 |
| Beryllium | 0.5 |
| Bismuth | 10 |
| Cadmium | 2 |
| Calcium | 66200 |
| Chromium | 28 |
| Cobalt | 8 |
| Copper | 35 |
| Iron | 14100 |
| Lead | 50 |
| Lithium | 6 |
| Magnesium | 12300 |
| Manganese | 2920 |
| Mercury | 0.045 |
| Molybdenum | 4 |
| Nickel | 28 |

TABLE 2-continued

| Element | mg/dry/kg |
|---|---|
| Phosphorus | 2460 |
| Selenium | 50 |
| Silver | 2 |
| Strontium | 289 |
| Thallium | 50 |
| Tin | 10 |
| Titanium | 1050 |
| Vanadium | 37 |
| Zinc | 429 |

Example 1

The following summarizes results of a pilot-scale sorbent evaluation testing for mercury control. Sorbent evaluation was conducted in a GE Energy 300 kW Boiler Simulator Facility located in Santa Ana, Calif. The wood ash was supplied to GE. GE performed tests using the sorbent "as received" and activated a portion of the sorbent using a GE proprietary brominating process using gaseous bromine. During these tests, the sorbent was injected upstream of an ESP (Electrostatic Precipitator). The mercury concentration in flue gas was measured upstream of the sorbent injection and downstream of the ESP.

Sorbent testing was conducted in two phases. In Phase I, three sorbents with bromine mass loading of 1%, 3%, and 10% were tested with Genesee coal "E". Testing results are presented in FIG. 1 along with data for Darco Hg-LH, which is a commercially available brominated sorbent from Norit Americas, Inc. (Marshall, Tex., USA). Sorbent injection rate in these tests was 1 lb/MMACF.

FIG. 1 shows that bromination of the GTS sorbent improved its performance although tested brominated sorbents were less effective than Darco Hg-LH. Performance of the brominated GTS sorbent improved as sorbent bromine loading increased.

In Phase II, GTS and brominated sorbents with bromine mass loading of 3% and 10% were tested at different sorbent injection rates. By the beginning of Phase II tests, the GE office in Santa Ana was informed by local authorities that coals with ash content higher than 13% could not be tested in BSF. Because ash content in the Genesee coal was about 20%, a decision was made to conduct Phase II testing with different low-rank coal. FIG. 2 shows results of Phase II testing. FIG. 2 shows that contrary to Phase I, results GTS sorbent with 3% bromine loading did not show improvement in the performance. The GTS sorbent with 10% loading showed better performance than the GTS sorbent only at an injection rate of 4 lb/MMACF. Thus, results of Phase II testing were not consistent and did not agree with Phase I results. It is possible that differences in coals used in Phase I and Phase II testing contributed to these performance differences although typically commercial brominated sorbents show similar performances for different low-rank coals.

Example 2

Wood Ash Size Distribution Analysis

The wood ash as received was ground by a rolling grinder. The basic principle was to mix ash with stainless balls and put them in a metal pail inside lined with rubber, and the metal pail was then rolled by a mechanical rolling machine for an extended time. The size distribution of the wood ash after grinding was analyzed by a Master-sizer 2000 (Malvern Instruments Ltd., Malvern, Worcestershire, UK) size distribution analyzer. The D50 of the ash was 17 mm. The results are shown in FIG. 3. Results show that the ground wood size is of close-to-normal distribution.

Example 3

Mercury Pulse Injection Experiments

In each test, a precisely weighed amount (about 40 mg) of sample was placed in a 4-mm i.d. quartz glass tube with temperature controlled by an oven to any desired temperatures. For each test point, 200 µL air saturated with $Hg^0$ was injected upstream of the sorbent (sample). One data point was collected after ten minutes at room temperature. The second data point was collected 10 minutes after heating-up the gold trap to 50° C. The temperature was increased with an increment of 50° C. for subsequent data points. At every temperature, the reading was taken after 10 minutes to drive off residual mercury captured by the tested sorbent. Calibration procedures as previously described were followed. For the convenience of discussion, the percentage of mercury that escaped from sorbent as collected by the gold trap and detected by CVAFS (Cold Vapor Atomic Fluorescence Spectrophotometry) to that injected upstream of the sorbent is termed the mercury breakthrough. A high mercury breakthrough value indicates that a high fraction of mercury injected passes through the sorbent (and less was captured by the sorbent), suggesting less efficient mercury capture. Mercury breakthrough data are plotted against tested temperatures in which the sorbents were subject to.

Mercury pulse injection tests is a reasonable way to simulate the dynamic mercury adsorption by sorbents, as occurs in power plants where sorbents are injected into the flue gas to capture mercury. An experimental set up for mercury capture tests is shown in FIG. 4.

The samples used in this example and in FIGS. 5-9 are identified as follows:

TABLE 3

| Sample ID | Sample Description |
|---|---|
| HGLH | Norit HG-LH sorbent. |
| WARaw | Wood ash after grinding without bromination. |
| WA1 | Wood ash after grinding and brominated with $Br_2$ at 5 wt % level and treated at 150° C. |
| WA2 | Wood ash after grinding and brominated with $Br_2$ at 5 wt % level and treated at 200° C. |
| WA3 | Wood ash after grinding and brominated with $Br_2$ at 10 wt % level and treated at 150° C. |
| WA4 | Wood ash after grinding and brominated with $Br_2$ at 10 wt % level and treated at 200° C. |
| WA5 | Wood ash after grinding and brominated with $Br_2$ at 15 wt % level and treated at 150° C. |
| WA6 | Wood ash after grinding and brominated with $Br_2$ at 15 wt % level and treated at 200° C. |

Mercury pulse injection test results are shown in FIGS. 5 to 9.

FIG. 5 shows that, under the tested conditions, bromination significantly increases the mercury capture by wood ash. As bromination increases from 5% to 10% to 15%, mercury capture increases. In terms of mercury capture, brominated wood ash behaves similarly to HGLH.

FIG. 6 shows that, under the tested conditions, bromination significantly increases the mercury capture by wood ash. As bromination increases from 5% to 10% to 15%, mercury capture increases. In terms of mercury capture, brominated wood ash behaves similarly to HGLH.

FIG. 7 shows that, under the tested conditions, bromination significantly increases the mercury capture by wood ash. As bromination increases from 5% to 10% to 15%, mercury capture increases. In terms of mercury capture, brominated wood ash behaves similarly to HGLH. The wood ash treated at different temperatures shows little difference in capturing mercury.

FIG. 8 shows that, under the tested conditions, bromination significantly increases the mercury capture by wood ash. As bromination increases from 5% to 10% to 15%, mercury capture increases. In terms of mercury capture, brominated wood ash behaves better than HGLH. The wood ash treated at different temperatures shows little difference in capturing mercury.

FIG. 9 shows that, under the tested conditions, bromination significantly increases the mercury capture by wood ash. As bromination increases from 5% to 10% to 15%, mercury capture increases. In terms of mercury capture, brominated wood ash behaves better than HGLH. The wood ash treated at different temperatures shows little difference in capturing mercury.

Summary of Example 3

As indicated by mercury breakthrough test results, bromination of the wood ash is an effective way to increase its mercury capture capability. In terms of mercury capture capability, under tested conditions, brominated wood ash performs similarly to or better than Norit HG-LH.

The breakthrough temperatures for the brominated ash with 5% bromine were similar to that of Norit HG-LH. The break-through temperature increased from about 100° C. for raw ash to 200° C. for the brominated ash (5%). For 10% bromine, the breakthrough started at 250° C. Bromination higher than 10 wt % does not show any significant further improvement.

The data from WA5 and WA6 at higher temperatures seem inconsistent with that of WA1, WA2, WA3 and WA4. The reason might be the contamination of the gold trap by the release of bromine from the samples as this was at a temperature higher than the treatment temperature after bromination.

Example 4

The principle of Example 4 was to mix bromine vapor with wood ash thoroughly with a chemo-mechanical method. In particular, a mechanical method was used to assist and enhance bromine adsorption by wood ash.

The following steps were effected in a scaled-up chemical-mechanical bromination process:

1763 grams of 6 mm glass beads were placed in a 3.8 L glass bottle.

About 50 grams of liquid bromine were dropped on the glass beads.

500 Grams of raw wood ash were scooped on the top of glass beads.

The glass bottle was sealed.

The glass bottle containing the above mixture was rotated on a roller for 30 minutes.

The mixture was poured out on a 3.35 mm sieve and the glass beads were separated from wood ash.

A schematic of the glass bottle on rollers is shown is FIG. 10.

The samples used in this example and in FIGS. 11-14 are identified as follows:

TABLE 4

| Sample ID | Sample Description |
| --- | --- |
| HGLH | Norit HG-LH sorbent. |
| WARaw | Wood ash after grinding without bromination. |
| WA3 | Wood ash after grinding and brominated with $Br_2$ at 10 wt % level and treated at 150° C. |
| WA4 | Wood ash after grinding and brominated with $Br_2$ at 10 wt % level and treated at 200° C. |
| G1 | Bromination at 10 wt % level and treated at 200° C., using scaled-up method |
| G2 | Bromination at 10 wt % level and treated at 200° C., with higher glass bead/wood ash mass ratio, otherwise the same as G1 |

Table 5 illustrates weight loss analysis after 36 hours for raw ash and samples G1 and G2.

TABLE 5

Weight loss analysis after 36 Hours

| Sample | Glass Beads:Ash Ratio | Level of Bromniation | $d_{50}$ (μm) | Wt. loss (%) |
| --- | --- | --- | --- | --- |
| Raw ash | n/a | n/a | n/a | 1.9 |
| G1 | 3.526 | 11.9 | 62.9 | 6.4 |
| G2 | 7.052 | 10 | 31.1 | 5.1 |

Table 6 illustrates weight loss uniformity for raw ash and samples G1 and G2.

TABLE 6

Weight loss analysis - Uniformity

| | Weight Loss (%) | | | |
| --- | --- | --- | --- | --- |
| Material | Sample 1 | Sample 2 | Sample 3 | Sample 4 |
| Raw Ash | 1.9 | 1.9 | 1.7 | 2.1 |
| G1 | 6.0 | 6.1 | 6.5 | 7.7 |
| G2 | 5.0 | 5.3 | 5.2 | 5.0 |

Table 7 illustrates elemental analysis for raw ash and samples G1, G2, and HGLH.

TABLE 7

XPS Element Analysis

| | G1 | G2 | HGLH | Raw Ash |
| --- | --- | --- | --- | --- |
| Br | 17.91 | 15.41 | 2.53 | 0 |
| C | 52.63 | 62.56 | 74.04 | 68.76 |
| O | 16.65 | 13.40 | 14.35 | 19.4 |

Summary of Example 4: Chemical-mechanical bromination is effective.

Example 5

The brominated wood ash was loaded into the injection system silo provided by ADA-Environmental Solutions (Birmingham, Ala.).

Once the silo was loaded, the sorbent was allowed to settle for approximately 3 hours. Once settled, the feeders were calibrated for an injection rate of 1 lbs/MmAcf. Inlet and outlet CMMS (continuous mercury monitoring systems) were used to monitor inlet and outlet mercury levels. Sorbent trap was also run during the test to verify CMMS at the outlet.

The results are shown in FIGS. 15 to 18. In these Figures, GTS refers to the wood ash, GTS-B refers to the brominated wood ash, LH refers to low halogen, PPP refers to power pac premium, CTI and CI refer to continuous injection, and SDA refers to spray dryer absorber.

The results of these tests may be summarized as follows. For the non-brominated sorbent at 0.75 lb/MMacf injection concentration (SDA inlet temperature bias) there was an increase in the mercury removal from 73% baseline to 79% during injection. For the brominated sorbent at 1.0 lb/MMacf injection concentration (SDA inlet temperature bias) there was an increase in the mercury removal from 70% baseline to 87% during injection.

In one embodiment, the sorbent can be injected into a flue gas duct prior to the precipitator/baghouse or prior to air preheater using lances designed to provide uniform sorbent distribution in the duct. CFD (computational fluid dynamics) modeling results may be used to design the lances and select a preferred location. The injection location may be after the air preheater and before the baghouse/precipitator. The sorbent may be used in various combustion streams and reference is made to U.S. Pat. Nos. 6,593,494 and 7,361,209 for examples of sorbent use. The contents of these two patents is incorporated herein by reference.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A bromination process comprising:
   contacting a fly ash substrate with liquid bromine for a sufficient time to increase the mercury adsorbing ability of the fly ash substrate to provide a brominated mercury sorbent capable of adsorbing mercury in a combustion gas.

2. The process of claim 1, wherein the liquid bromine has a purity of at least 99.9%.

3. The process of claim 1, wherein the fly ash substrate is wood ash.

4. The process of claim 1, further comprising, prior to the contacting, drying the fly ash substrate.

5. The process of claim 4, wherein the drying is effected at a temperature of less than 90° C.

6. The process of claim 1, further comprising, prior to the contacting, drying the fly ash substrate to a moisture content below 5%.

7. The process of claim 1, wherein the contacting step comprises combining the fly ash substrate and liquid bromine in a glass container with glass beads.

8. The process of claim 1, further comprising the step of reducing the particle size distribution of the fly ash substrate or mercury sorbent to a distribution fluidizable in the ductwork of a combustion gas stream.

9. The process of claim 1, wherein the fly ash substrate is brominated to 1 to 10 weight percent bromine.

10. The process of claim 1, wherein the fly ash substrate is brominated to 1 to 15 weight percent bromine.

11. The process of claim 1, wherein the fly ash substrate is brominated to 5 to 10 weight percent bromine.

12. The process of claim 1, wherein the fly ash substrate is brominated to 5 to 15 weight percent bromine.

13. The process of claim 1, wherein the fly ash substrate is brominated to 1 to 20 weight percent bromine.

14. The process of claim 1, wherein the fly ash substrate is brominated to 5 to 20 weight percent bromine.

15. The process of claim 1, wherein the brominated mercury sorbent is capable of adsorbing mercury in a combustion gas at a temperature greater than 60° C.

16. The process of claim 1, wherein the contacting step occurs at a temperature greater than 150° C.

17. A method for removing mercury from a mercury-containing combustion gas in an exhaust gas system, comprising the steps of: contacting a fly ash substance with liquid bromine for a sufficient time to increase the mercury adsorbing ability of the fly ash substrate to provide a brominated mercury sorbent; injecting the mercury sorbent into a stream of the mercury-containing combustion gas for a sufficient time to allow at least a portion of the mercury in the combustion gas to adsorb onto the mercury sorbent; and collecting and removing the mercury sorbent from the combustion gas stream.

18. The method of claim 17, wherein the liquid bromine has a purity of at least 99.9%.

19. The method of claim 17, wherein the fly ash comprises wood ash.

20. The method of claim 17, wherein the mercury sorbent has a particle size distribution that is fluidizable in the combustion gas stream.

* * * * *